United States Patent
Harper

(10) Patent No.: US 9,077,680 B2
(45) Date of Patent: *Jul. 7, 2015

(54) OFFENDER MESSAGE DELIVERY SYSTEM

(71) Applicant: Core Systems (NI) Limited, Belfast (IE)

(72) Inventor: Terry D. Harper, La Quinta, CA (US)

(73) Assignee: CORE SYSTEMS (NI) LIMITED, Belfast (IE)

( * ) Notice: Subject to any disclaimer, the term of this patent is extended or adjusted under 35 U.S.C. 154(b) by 2 days.

This patent is subject to a terminal disclaimer.

(21) Appl. No.: 13/938,990

(22) Filed: Jul. 10, 2013

(65) Prior Publication Data

US 2014/0047026 A1  Feb. 13, 2014

Related U.S. Application Data

(63) Continuation of application No. 13/479,096, filed on May 23, 2012, now Pat. No. 8,509,390, which is a continuation of application No. 12/780,830, filed on May 14, 2010, now Pat. No. 8,204,177, which is a (Continued)

(51) Int. Cl.
*H04M 3/22* (2006.01)
*H04L 12/58* (2006.01)
*G06Q 20/38* (2012.01)
*G06Q 30/06* (2012.01)
*G06Q 50/26* (2012.01)

(52) U.S. Cl.
CPC .............. *H04L 51/34* (2013.01); *G06Q 20/382* (2013.01); *G06Q 30/0601* (2013.01); *G06Q 50/26* (2013.01); *H04L 51/24* (2013.01)

(58) Field of Classification Search
USPC .............. 370/352; 379/45, 32.01, 35, 100.01, 379/100.03, 100.05, 100.13, 67.1, 88.22, 379/88.25, 38
See application file for complete search history.

(56) References Cited

U.S. PATENT DOCUMENTS 6,665,380 B1 * 12/2003 Cree et al. .................. 379/88.25
6,668,045 B1    12/2003 Mow
(Continued)

FOREIGN PATENT DOCUMENTS

GB    2384412 A    7/2003

OTHER PUBLICATIONS

*Kiosks Do Time in U.S. Jails*. Retrieved Dec. 15, 2010, from http://www.selfserviceworld.com/article_print/165301/Kiosks-do-time-in-U-S-jails/.

(Continued)

*Primary Examiner* — Olisa Anwah
(74) *Attorney, Agent, or Firm* — Kilpatrick Townsend & Stockton LLP

(57) ABSTRACT

A correctional facility communication system for sending an external message to an offender of a correctional facility is disclosed. The correctional facility communication system includes a messaging system and a correctional facility system coupled together with a wide area network. The messaging system is at a first location and the correctional facility system is at a second location, different from the first location. The messaging system authenticates a sender of the external message, receives the external message in electronic form at the first location, checks the external message against criteria specified by the correctional facility, determine a second location of the offender and a corresponding printer, and sends the external message to the second location for automatic printing with the corresponding printer.

20 Claims, 6 Drawing Sheets

Related U.S. Application Data continuation of application No. 11/357,869, filed on Feb. 16, 2006, now Pat. No. 7,742,582.

(60) Provisional application No. 60/654,546, filed on Feb. 17, 2005.

(56) References Cited

U.S. PATENT DOCUMENTS

| | | | |
|---|---|---|---|
| 7,039,171 B2 | 5/2006 | Gickler | |
| 7,042,992 B1 | 5/2006 | Falcone et al. | |
| 7,085,359 B2 | 8/2006 | Crites et al. | |
| 7,502,451 B2* | 3/2009 | Gyllenskog et al. | 379/100.08 |
| 7,545,921 B2* | 6/2009 | Leonard | 379/144.02 |
| 7,640,190 B1 | 12/2009 | Sullivan et al. | |
| 7,742,582 B2 | 6/2010 | Harper | |
| 8,204,177 B2 | 6/2012 | Harper | |
| 8,370,206 B2 | 2/2013 | Collins | |
| 8,488,756 B2* | 7/2013 | Hodge et al. | 379/100.08 |
| 2004/0083479 A1 | 4/2004 | Bondarenko et al. | |
| 2005/0114192 A1 | 5/2005 | Tor et al. | |
| 2005/0259801 A1 | 11/2005 | Bullard et al. | |
| 2006/0245559 A1* | 11/2006 | Hodge et al. | 379/88.19 |
| 2006/0285650 A1 | 12/2006 | Hodge | |
| 2007/0041545 A1 | 2/2007 | Gainsboro | |
| 2007/0277231 A1 | 11/2007 | Medvinsky et al. | |
| 2008/0201158 A1 | 8/2008 | Johnson et al. | |
| 2009/0013359 A1 | 1/2009 | Butler et al. | |
| 2009/0076823 A1 | 3/2009 | Collins | |
| 2009/0076832 A1 | 3/2009 | Collins | |
| 2010/0299761 A1 | 11/2010 | Shapiro | |

OTHER PUBLICATIONS

Bussewitz, Cathy, *Inmate Internet Access Plan Advances*. Retrieved Mar. 4, 2011, from http://www.tahoedailytribune.com/apps/pbcs.dll/article?AID=/20090312/NEWS/903129979/1056/NONE&parentprofile=1056&title=Inmate%20Internet%20access%20plan%20advances&template=printart/.

Corrections Media Services. *Digital Media for Corrections & Mp3 Players for Inmates*. Retrieved Dec. 10, 2010, from http:/fwww.musicforinmates.com/index.html.

HEAD4HELP. *Kiosk Sessions*. Retrieved Dec. 10, 2010, from http://www.head4help.com/kiosk.html.

indy.com. *Video Kiosks Link Families, Indiana Inmates*. Retrieved Dec. 10, 2010, from http://www.indy.com/posts/video- kiosks-link-families-indiana-inmates/.

Keefe Group, Inc. *The Edge*. Retrieved Mar. 7, 2011, from http://www.keefegroup.com/index.php?p=88/.

Northern Ireland Prison Service. *Minister Goggins visit to Magilligan: Prisons' Minister Launches Innovative Kiosks for Magilligan Prison*. Retrieved Mar. 4, 2011, from http://www.niprisonservice.gov.uk/module.cfm/opt/10/area/Press%20Releases/page/pressrel/year/2006/month/05/pid/225/.

Rarick, E., et al., "On Prison Kiosks, Inmates Learn Job Search Skills," *Corrections Today*, Aug. 2009, pp. 56-58.

Schultz, J., *Packages for Jail Inmates Can Be Bought Online*. (Oct. 13, 2009). Retrieved Dec. 10, 2010, from http://www.redding.com/news/2009/oct/13/kit-packages-for-jail-inmates-can-be-bought/.

Secure Media Systems, "Inmate Music and Media Program: bringing correctional media into the 21$^{st}$ centry," 2008:1 page.

Securus Technologies, Inc. *Secure Instant Mail*. Retrieved Dec. 13, 2010, from http://www.t-netix.com/product_detail.asp?product_id=34/.

*T-NETIX to Provide Corrections Industry E-Business Capabilities Through Joint Venture*. (May 30, 2000). Retrieved Dec. 10, 2010, from http://www2.prnewswire.com/cgi-bin/stories.pl?ACCT=104&STORY=/www/story/05-30- 2000/0001230098&EDATE/.

Vickery, Dana. *Keefe Group Launches New Technology Division, Access Corrections™*. Retrieved Dec. 10, 2010, from http://www.keefegroup.com/index.php?p=59/.

About, Inc., *Families of Prisoners*. Retrieved Feb. 16, 2006, from http://crime.about.com/od/prison_families/.

Advanced Technologies Group. *Offender Management Suite*. Retrieved Feb. 16, 2006, from http://www.a-t-g.com/.

*A Service of the Information Network of Arkansas*. Retrieved Feb. 16, 2006, from http://www.arkansas.gov/.

Author Unknown, "2005 NASCIO Nomination, Digital Government: Government to Citizen, Arkansas Department of Correction Inmate Banking," no date. 4 pages.

CBS News, *Gangs Thrive in Maximum Security*. Retrieved Feb. 16, 2006, from http://www.cbsnews.com/stories/2005/05/12/60minutes/printable694851.shtml.

CBS News, *New PC Fingerprint Passwords*. Retrieved Feb. 16, 2006, from http://www.cbsnews.com/stories/2004/09/09/scitech/pcanswer/printable642476.shtml.

*Digital Music Distribution*. Retrieved Mar. 7, 2011, from http://www.dmdllc.org/about.htm.

InmatesMail. *InmatesMail with Inmate Locators*. (n.d.). Retrieved from www.inmatesmail.com/.

JPay Blog. *JPay, The #1 Choice in Correctional, Agency Services*. Retrieved Mar. 7, 2011, from http://blog.jpay.com/jpay-the-1-choice-in-correctional-agency-services/815/.

JPay, Inc. *jpay, The Easy Way to Send Money to an Inmate*. Retrieved 2006, from http://www.jpay.com/.

Justnet. *Contraband Detection in Inmate Mail*. Retrieved Feb. 16, 2006, from http://www.nlectc.org/assistance/inmate_mail.html.

Keefe Group, Inc. *Access Corrections™ introduces the Access to Entertainment™ MP3 player and program, specifically designed and manufactured for greater safety and security in the correctional industry*. Retrieved Mar. 7, 2011, from http://www.keefegroup.com/index.php?p=84/.

Micciche, P. "Colorado Department of Corrections Launches Inmate Locator On-line System," *Colorado Department of Corrections News Release*, Dec. 5, 2005, 1 page.

Mintie, D., *Washington DOC Monitors Offenders with Biometrics*. Retrieved Dec. 20, 2005, from http://www.biometricwatch.com/BW_in_print/washington_doc_handgeometry.htm.

Nichols, J. *Prisoner monitor gets a test*. (Dec. 25, 2005). Retrieved Feb. 14, 2006, from http://www.azcentral.com/.

Pistole, J. S. *Congressional Testimony: Terrorist Recruitment in Prisons and the Recent Arrests Related to Guantanamo Bay Detainees*. (Oct. 14, 2003). Retrieved Feb. 15, 2006, from http://www2.fbi.gov/congress/congress03/pistole101403.htm.

Reason Public Policy Institute. *Competitive Corrections Research Project*. (2004). Retrieved Feb. 16, 2006, from http://www.rppi.org/privatization/ccrp/index.shtml.

Regional Advisory Council, "Regional Advisory Council Meeting Minutes," *National Law Enforcement and Corrections Technology Center*, Rocky Mountain Region. Denver, CO, Jul. 20 & 21, 2006, 5 pages.

Trovillion, A. *Maintaining Family Contact When a Family Member Goes to Prison: An Examination of State Policies on Mail, Visiting, and Telephone Access*. (Nov. 1998) Retrieved Feb. 16, 2006, from http://www.fplao.org/MaintainingFamilyContact.html.

\* cited by examiner

US 9,077,680 B2

OFFENDER MESSAGE DELIVERY SYSTEM

This application is a continuation of U.S. patent application Ser. No. 13/479,096 filed May 23, 2012, which is a continuation of U.S. patent application Ser. No. 12/780,830 filed May 14, 2010, which is a continuation of U.S. patent application Ser. No. 11/357,869, filed Feb. 16, 2006, which claims the benefit of U.S. Provisional Application No. 60/654,546 filed on Feb. 17, 2005, each of which is hereby incorporated by reference herein in its entirety.

BACKGROUND

This disclosure relates in general to message delivery and, but not by way of limitation, to delivery of messages for incarceration facilities.

Offenders in correctional facilities can send and receive postal service mail. This mail can take weeks to get through screening that may be performed at a correctional facility. In some cases, the mail can be in a foreign language, which can further delay screening. Screening may include searching for contraband and reading the content.

Correctional facilities are under constant pressure to reduce costs and perform more efficiently. Delivery and control of mail is labor intensive. Legal papers are controlled to restrict review. Often, the legal papers have their envelope opened in front of a prisoner to assure that the legal papers are received without review.

The anthrax terrorist attacks on the postal system in the United States demonstrated how venerable the mail delivery is to this type of terrorist threat. Correctional facilities are vulnerable to this sort of threat and do not lack persons who wish to inflict damage on these institutions. Mail rooms have become the front line for these sorts of attacks.

Offenders are known to use the mail system to pass improper messages. Despite screening, the mail system often misses coded messages and contraband. Manual review of letters is labor intensive and subject to error. For example, the letter may be in a foreign language not understood by the reviewer.

BRIEF DESCRIPTION OF THE DRAWINGS

The present disclosure is described in conjunction with the appended figures.

Figure 1A:
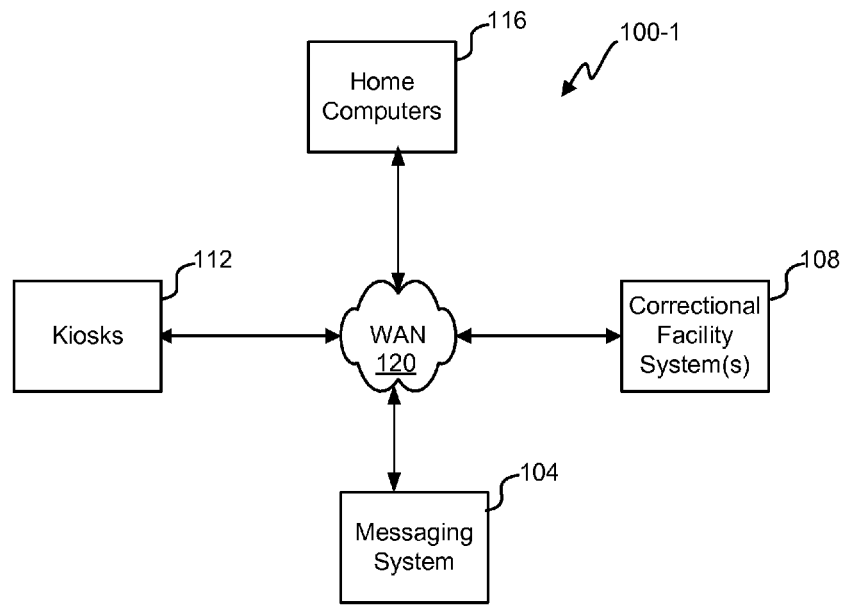
FIGS. 1A and 1B depict block diagrams of embodiments of a communication system.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It being understood that various changes may be made in the function and arrangement of elements without departing from the spirit and scope as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps or blocks not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Referring first to FIG. 1A, a block diagram of an embodiment of a communication system 100-1 is shown. The communication system 100 allows sending and receiving messages between an offender within the correctional facility system 108 and a member of the public interacting with the messaging system 104. A home computer 116 or kiosk 112 can be used by the member of the public to interact with the messaging system 104. There could be a single correctional facility system 108 or multiple correctional facility systems 108 that are accessible from the messaging system 104. The correctional facility systems 108 could be groups of correctional facilities arranged by city, county, state, country, private company, or other commonality. The term correctional facility is meant to include any institution housing offenders, offenders and/or prisoners, for example, a jail, a federal or state detention center or a military prison.

The messaging system 104 has an application or web interface that is accessible from a wide area network (WAN) 120. Any home computer 116, kiosk 112, personal digital assistant (PDA), mobile phone, web pad, laptop or other computing device can interact with the messaging system 104 in various embodiments. The kiosks 112 could be located at a correctional facility system 108, library, post office, judicial building, business, law firm, or other location.

Various embodiments have different ways to enter messages. In one embodiment, a voice recognition system accessible from a phone line, for example, can be used to enter a message for the messaging system 104. The home computer or kiosk 112, 116 includes a keyboard, mouse and/or voice interface to allow entering messages. Some embodiments of the home computer or kiosk 116, 112 could include a scanner to enter typed or handwritten messages. Photographs could be sent by loading them from some sort of machine readable medium or scanning them.

In this embodiment, the messaging system 104 is coupled to the correctional facility system by way of the WAN 120. The WAN could include the Internet, private connections and/or virtual private networks to facilitate this communication. This embodiment encrypts the communication between the messaging system 104 and the correctional facility system 108 over a public network such as the Internet. Although various embodiments show certain blocks being implemented in the messaging system 104 or correctional facility system 108, those skilled in the art appreciate that those blocks could be shuffled around the communication system 100.

Figure 1B:
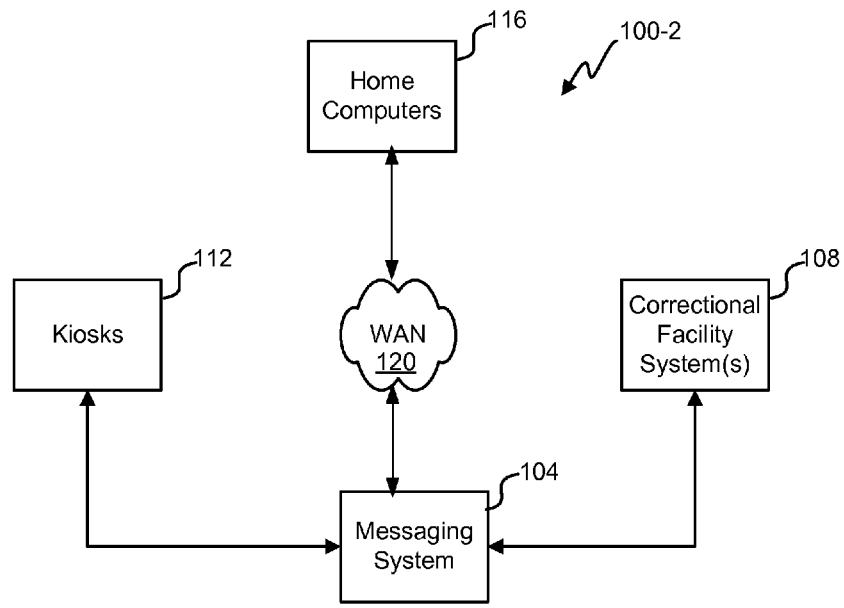

With reference to FIG. 1B, a block diagram of another embodiment of a communication system 100-2 is shown. In this embodiment, only the home computers 116 use the WAN 120 to communicate with the messaging system 104. The kiosks 112, messaging system 104 and correctional facility system(s) 108 use direct connections. For example, the kiosk might have an encrypted link or circuit switched connection to the messaging system 104. Any topology of circuit or packet switched or public or private networks could be used to facilitate data transfer in the communication system 100.

Figure 2A:
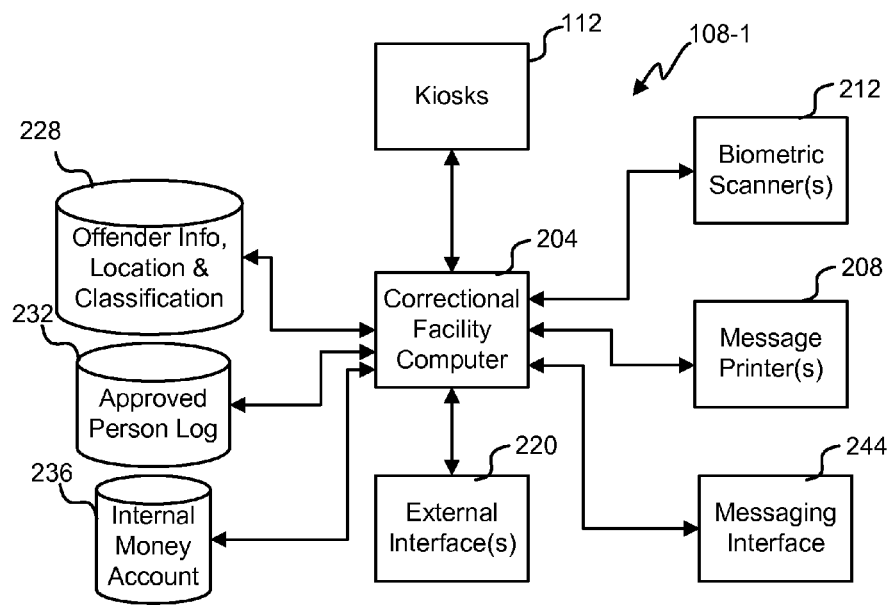
FIGS. 2A and 2B depict block diagrams of embodiments of a correctional facility system.

Referring next to FIG. 2A, a block diagram of an embodiment of the correctional facility system 108-1 is shown. A correctional facility computer 204 generally controls the correctional facility system 108. The correctional facility computer could be a number of computers distributed throughout the correctional facility system 108 that communicate with a network. Kiosk 112 may be made available to offenders in some embodiments to allow sending and/or reading messages. Some embodiments do not allow reading messages at the kiosks 112, which are printed by a message printer 208 for hand delivery to the offender.

An approved person log 232 is maintained at the correctional facility system 108. Approved persons could include relatives, those approved for visitation, legal representatives, law enforcement, etc. Approved persons that can visit the offender could have a biometric stored in the approved person log 232. A biometric scanner 212 at a correctional facility could be used to gather the biometric. Other embodiments could use public biometric information such as drivers license fingerprints or photos. Biometric scanners at the kiosks 112 and home computers 116 can be verified against those stored in the approved person log 232 to authenticate identity for visitation or messaging purposes. In some cases, an approved person may have a background check to allow authorized contact with the offender.

An external interface 220 is used to communicate with the correctional facility system 108. This external interface 220 could be for a single correctional facility or a system of correctional facilities. Communication with the external interface 220 is protected from hacking by using cryptography or physical security in various embodiments. In this embodiment, the external interface 220 uses a virtual private network to connect through the Internet to the messaging system 104. Another embodiment uses a circuit switched network in the external interface 220 to provide physical security.

Message printers 208 are distributed through the correctional facility system 108 to allow efficient delivery of messages to offenders. The message printers can print messages with bar code, watermark, RFID, or other tracking embedded to allow tracking messages. Additionally, location and recipient information for the offender could be printed to ease delivery. The tracking information, location and recipient information could be printed on the back of sheets or in margins. For legal correspondence, the message printers could print messages and automatically insert them into an envelope to insure privacy of that communication. At delivery, the legal document can be opened in the presence of the offender if that is the correctional facility policy.

In some embodiments, the message printer 208 or special photo printers can print a photograph included with the message or sent separately. Various sized photos may be allowed for different price points. Software at the messaging system 104 could be used to screen photos for appropriateness.

An messaging interface 244 to an operator could allow confirming the offender is located near the printer and to screen any flagged messages. Messages are automatically screened at the messaging system 104 as described below, but could be manually screened when flagged or when warranted for an offender or group of offenders using the messaging interface 244. Messages screened out during this process would not be printed for delivery to the offender. The messaging interface 244 is also used to configure the messaging system according to the policies for the correctional facility, group of offenders and/or a particular offender. Rules and policies can be entered from pre-configured templates or created from scratch.

In cases where the wrong printer 208 for an offender is initially chosen, the messaging interface could be used to re-route the message. In one embodiment, all messages are sent to an operator for manual routing to the appropriate printer 208. Some embodiments determine routing to the printer 208 at the messaging system 104 or the correctional facility system 108 in any number of automatic and/or manual ways.

An internal money account 236 may be used to fund the message delivery costs for each prisoner in one embodiment. The internal money account 236 could be the same account used to fund other purchases by the offender. In other embodiments, an external money account is maintained by the messaging system 104. The internal money account 236 could be used to fund the external money account or it could be funded in other ways (e.g., credit/debit card, wire transfer, cash deposit at correctional facility, electronic check, mailed check).

An offender information, location and classification database ("offender database") 228 is used to track various information related to the offender. The current location of the offender (i.e., correctional facility, cell block, cell identifier, floor, bed, etc.) is recorded in the offender database 228. The classification of the offender is also stored such that groupings of offenders with similar classifications can be determined. Any investigatory flagging can also be stored such that messages are viewed with greater scrutiny. Persons capable of communicating with the offender are also stored such that messages can be limited to those persons who have been also approved. Biometrics used in authenticating the offender when using the kiosk 112 is also stored in the offender database 228.

Figure 2B:
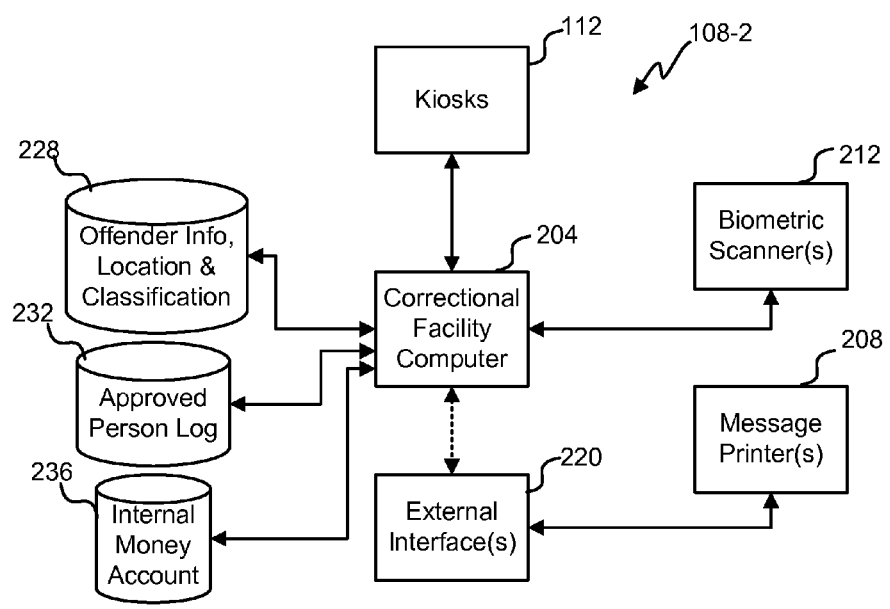

With reference to FIG. 2B, a block diagram of another embodiment of the correctional facility system 108-2 is shown. This embodiment of the correctional facility system 108-2 does not have a messaging interface 244, which could allow configuration at the messaging system. The operator at the printer could manually review the printed messages and/or photos. Any flagged messages and/or photos could be held at the messaging system for review there before putting them through to the message printer 208.

This embodiment doesn't have a persistent connection between the external interface 220 and the remainder of the correctional facility system 108-2. Messages are received by the external interface 220 for output by the message printer 208 without information from the remainder of the correctional facility system 108-2. Intermittently, the external interface 220 may be used to allow configuring or reconciling data with the messaging system 104. For example, a disk may be used to transport information that is sent by the external interface 220 to the messaging system 104. The transported information could be used by the messaging system to properly screen, test and route messages, for example.

Figure 3A:
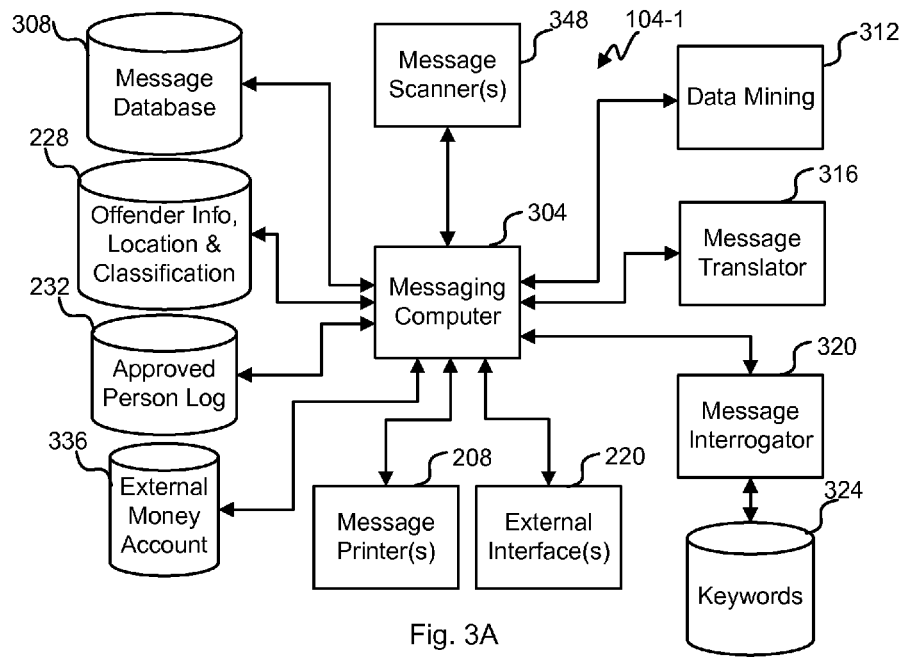
FIGS. 3A and 3B depict block diagrams of embodiments of a messaging system.

Referring next to FIG. 3A, a block diagram of an embodiment of a messaging system 104-1 is shown. Some blocks are similar to those of prior figures. Specifically, the external interface 220 allows communication with correctional facility systems 108 and users, the message printer 208 allows printing of messages and pictures sent from offenders, the offender database 228 gathering of offender information from various correctional facilities, and the approved person log 232 that lists who can use the messaging system 104 for specified offenders. The messaging system 104 generally serves as the interface to the message function under the control of the messaging computer(s) 304. Additionally, screening, translation, data mining, setup, and other functions are performed or controlled by the messaging computer 304, which may include a number of computers and/or systems. Messages from an offender could be printed at the messaging system 104 for mail or courier delivery to an approved person or any mail recipient.

Messages for sending or reading are stored in the message database 308. According to policies for the group the offender belongs to or to unique flagging, messages may be archived for some amount of time. Once the offender is released or a period of time expires, the messages could be purged. In certain cases, the periodic purging could be stayed if there is an associated investigation or some other interest. In some embodiments, the message database may be duplicative of a number of databases at the correctional facilities that could also store messages.

A message scanner 348 allows digitizing messages or photos received in physical form. Some correctional facility systems 108 could require that all mail be routed through the messaging system 104 to avoid transporting contaminants and contraband into the correctional facilities using the mail system. Legal documents could be scanned at the law offices and uploaded to the messaging system 104 electronically for private delivery. These documents could be stored in the message database under an electronic seal or with encryption to protect the attorney-client privilege.

As mentioned above, an external money account 336 could log account balances. The account balance could be used to pay for the services of the messaging system 104 and/or to transfer funds to the internal money account 236. The offender and/or approved person could fund the external money account 336. Users of the messaging system 104 could be charged on a per message basis or according to a subscription. For example, for $10 a month a particular offender could receive up to 100 sheets of messages from any number of approved persons. The revenue collected to the service could be shared on a per sheet, per message, and/or profit share basis with the cooperating correctional facilities. For example, if it were $1 a sheet to print and deliver a picture, the messaging system could receive 80% with the remainder to the correctional facility who printed the photo.

All the messages in the message database 308 could be potentially investigated. A data mining block 312 would allow making these queries and finding patterns among messages in a manner done by data mining software. For example, when a new code word were uncovered, the data mining block 312 could query to see all the other messages from related individuals included that code word in an unusual way. Law enforcement officials could have access to the data mining tool 312 to perform these investigations. Users of the messaging system 104 could waive their right to privacy in the terms of use such that a warrant may not even be required.

The messaging system 104 could be capable of use in several different languages. When a particular offender or approved person chooses a non-English language, all messages are flagged for translation. Even if English menuing is chosen, the users are asked to specify the language of the message. Automatically, the message is translated by the message translator 316 to aid in automatic and manual review of the message. The message may be stored in both languages in the message database 308. Some embodiments, use the message translator 316 to allow communication between parties who only speak different languages. One party can specify the delivery language to the other party.

A message interrogator 320 performs several functions to screen and/or flag messages. A keyword database 324 could search for suspect terms that are globally specified or could only search messages from certain parties or groups for certain words. For example, any mention of "murder" could be flagged, but a code word "redlight" could only be flagged by the gang members known to use that term could be flagged. The message interrogator 320 also searches for unintelligible or odd communications. An unintelligible message could signal code is being used or that the translation was not performed correctly. Odd communications could be use of obscure terms in strange ways. For example, repeated use of a term such as "redlight" could point to a potential code word.

Any flagging or screening is noted in the message database and forwarded to the correctional facility system 108 for possible additional screening. Different screening policies could exist for different offenders or groups of offenders. For example, screening for gang code words in a minimum security half way house might not be performed unless an individual is suspected as belonging to a gang. The messaging computer 304 passes messages through the external interface 220 in communicating with the appropriate correctional facility system 108.

Figure 3B:
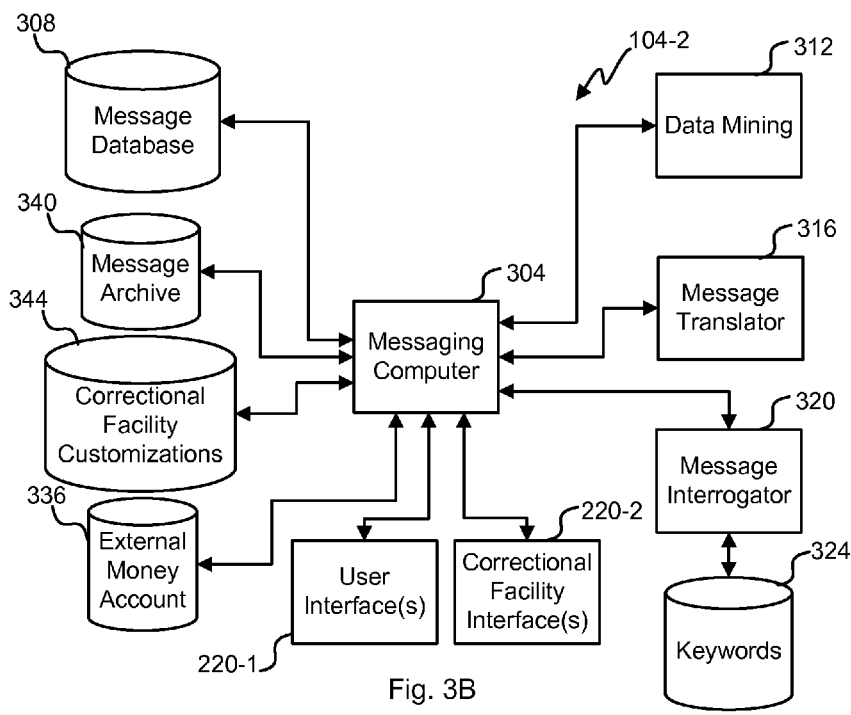

With reference to FIG. 3B, a block diagram of another embodiment of a messaging system 104-2 is shown. This embodiment does not include a message scanner 348 or message printer 208 to allow mail conversion for electronic messaging. This embodiment includes separate user interfaces 220-1 and correctional facility interfaces 220-2. The correctional facility interface 220-2 may be isolated from other parts of the messaging system 104 using physical security and/or firewalling. The messaging computer 304 be a secure processor or use other techniques to prevent hacking through the user interface 220-1 to get at confidential information or disable the messaging system 104.

The data structure of this messaging system 104-2 is different from other embodiments. The offender database 228 and approved person log 232 are not maintained in the messaging system 104. This information could be queried on demand from the relevant correctional facility system 108 rather than storing it locally. This embodiment includes a separate message archive 340 to keep those messages that are likely to be used for data mining in the future. The message archive 340 could be a back-up system that uses removable media, such as tapes or optical disks. If needed, these archived messages can be maintained for years.

This embodiment also includes a correctional facility customizations database 344. Each correctional facility system 108 can customize message policies for groups of offenders, individual offenders and/or subsets of groups of offenders. Further, translation and interrogation algorithms can be customized according to preferences by the various correctional facility systems 108. Revenue agreement terms can be placed in the customizations database 344 to allow automatic division of revenue.

Figure 4:
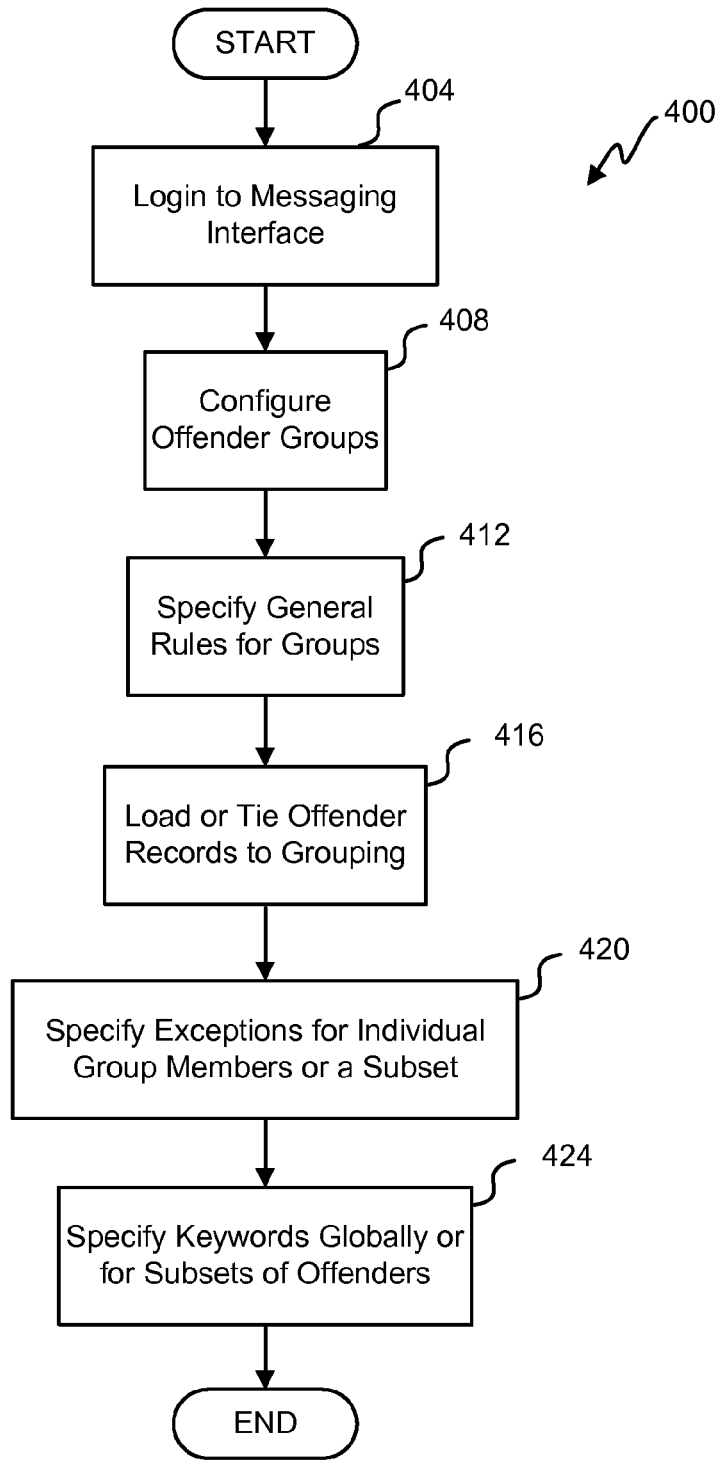
FIG. 4 illustrates a flow diagram of an embodiment of a process for customizing the communication system for a particular correctional facility system.

Referring next to FIG. 4, a flow diagram of an embodiment of a process 400 for customizing the communication system 100 for a particular correctional facility system 108 is illustrated. These customizations could be entered using the messaging interface 144 and stored in the correctional facility customizations database 344. The depicted portion of the process begins in block 404 where the operator logs into the messaging interface 244. A biometric could be used here for increased security. Some embodiments allow remote login, but others require the physical security of performing the customizations at the messaging system 104. Offender groups are configured in block 408. All offenders are categorized one or more of these groupings in the offender database 228. The groups could be by cell block, crime, category of crime, gang affiliation, approved person affiliation, etc.

In block 416, offender records are tied to the various groups in the offender database 228. Exceptions to various groupings can be specified individually or in a subset in block 420. For example, all undercover agents that are posing as gang members could be excluded from the policies specified for that group. Keywords can be specified globally or by group in block 424. Other configurations, could be performed although not shown in the figure.

Figure 5:
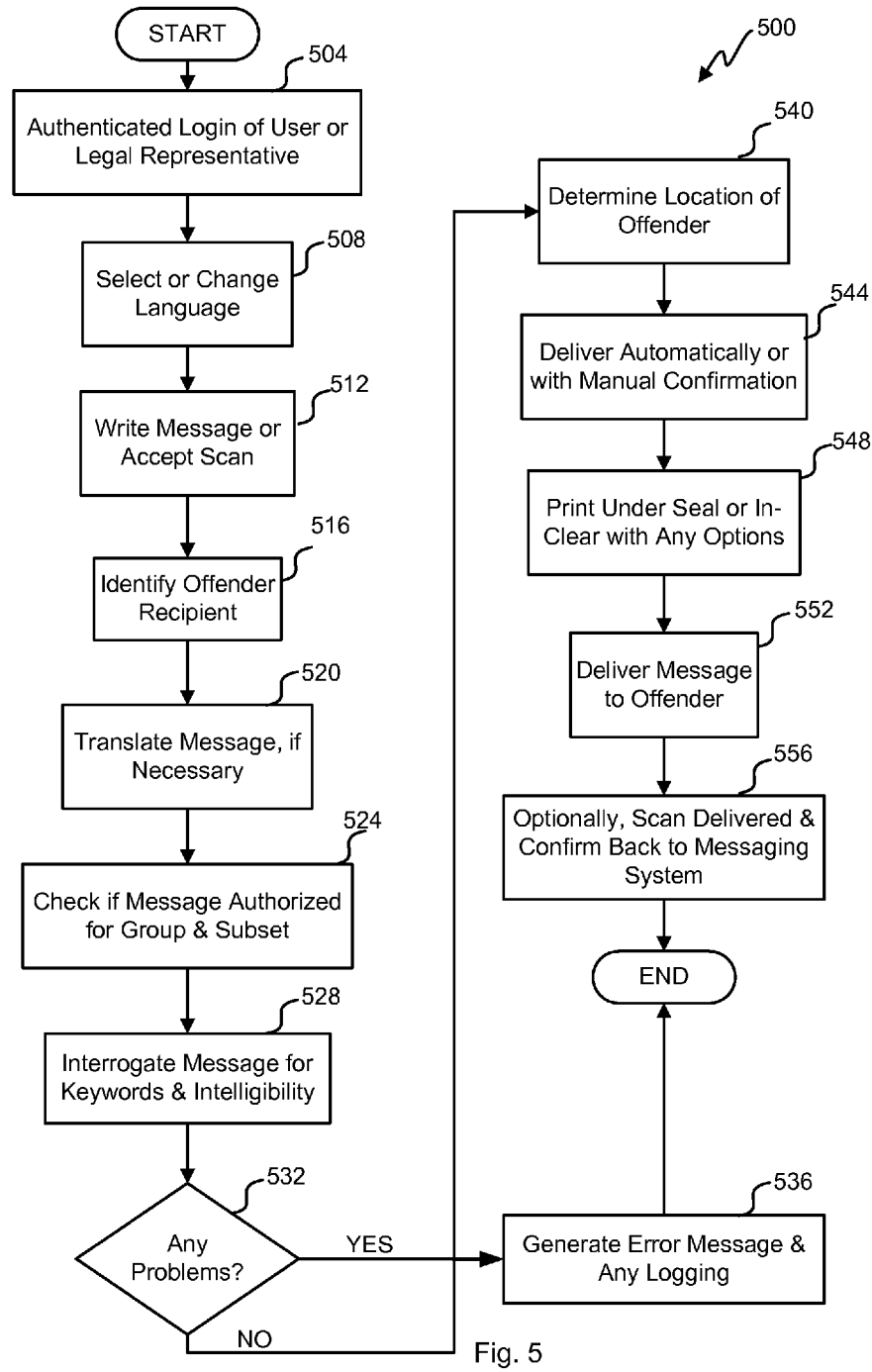
FIG. 5 illustrates a flow diagram of an embodiment of a process for sending a message to an offender.

With reference to FIG. 5, a flow diagram of an embodiment of a process 500 for sending a message to an offender is shown. The depicted portion of the process begins in block 504 where the user or legal representative is authenticated. This could include matching biometrics and checking the approved person log 232. First time users and legal representative might have to set up an account, get an authentic biometric scan and/or have a background check performed before use of the messaging system 104 is allowed. Where authorization passes, processing continues to block 508 where the language of the web site and/or message is specified.

The message is written, uploaded or scanned into the messaging system 104 in block 512. This message could be a photo or include a photo in addition to text. Where a legal representative wants the message to remain confidential, this can be specified. In block 516, the offender recipient is identified. A check is made to confirm that the approved person is authorized to exchange messages with the particular offender. If necessary, the message is translated in block 520. Both the translated and un-translated message are stored in the message database 308.

Policies for groups, individuals and subsets are checked in block 524 to determine if authorized. For example, a particular correctional facility might be in lock down at the time the message is entered such that it would be stored for possible later delivery. Some embodiments could limit the number or length of the messages. Authorization may also include checking for sufficient credit or money in the money account(s) 236, 336. In block 528, the message is interrogated for intelligibility and keywords. Other checks could be performed in this block to find patterns that should be flagged.

In block 532, a determination is made if there were any problems in the preceding blocks. Where there are problems, an appropriate error message is generated before possibly logging the error and/or message in block 536. The process could be initiated again or resumed once the problem is remedied. Where there is no problem processing goes from block 532 to block 540 to determine the location of the offender. This location is stored in the offender database 228 that might be local to the messaging system 104 or in the correctional facility system 108.

In block 544, the message is sent from the messaging system 104 to the proper correctional facility system 108. This may be automatically done where the offender location is discernable. Other embodiments may send all messages to a particular location for manual direction to the appropriate part of the correctional facility system. Yet other embodiments may deliver most automatically, but some are still routed manually when the location of the offender cannot be discerned. Flagged, blocked and/or questionable messages can also be reviewed manually in this block to further investigate if delivery is appropriate.

The message and/or photos are printed in block 548. For legal documents properly indicated, the printing can be done under seal to prevent viewing by correctional facility personnel under normal circumstances. Bar coding, water marking, expiration dates, delivery instructions, etc. can be included according to correctional facility customizations 344. In block 552, the message and/or pictures are delivered to the offender recipient. In this embodiment, a handheld scanner can scan a bar code associate with the printer and a bar code on the document to confirm delivery of the message. This delivery confirmation could be passed back to the messaging system 104 to provide an audit trail.

Figure 6:
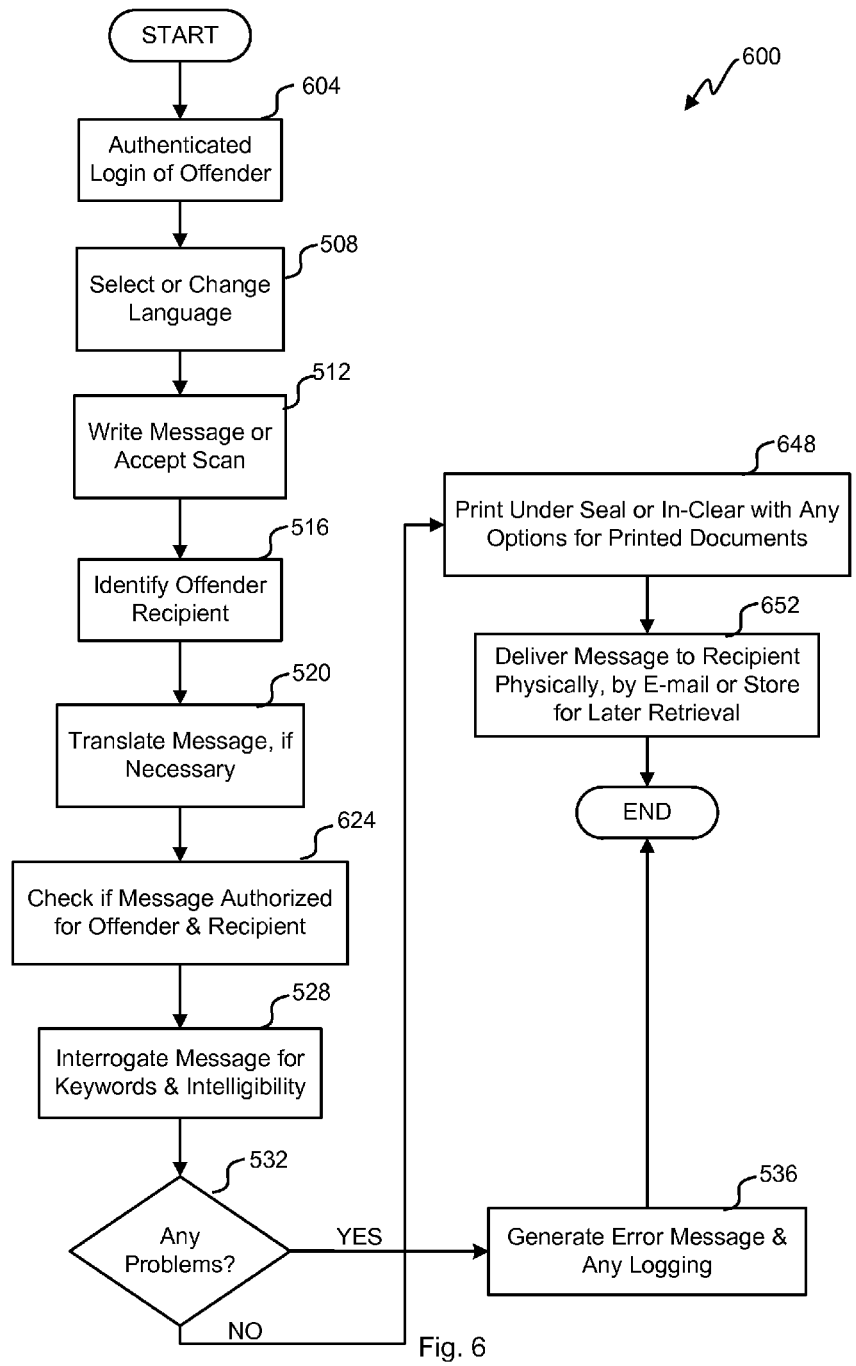
FIG. 6 illustrates a flow diagram of an embodiment of a process for sending a message from an offender.

Referring next to FIG. 6, a flow diagram of an embodiment of a process 600 for sending a message from an offender is shown. This process is similar to that performed when sending a message to the offender. The below description accentuates the differences from the prior described process. In block 604, the authentication is performed on the offender using biometrics, but could also include reading a correctional facility identity card. Blocks 508, 512, 516, and 520 are performed as before. In block 624, a determination is made of whether the offender and recipient are authorized. The recipient is registered with the messaging system and authorized. In this embodiment, the recipient can register an e-mail address or physical address without giving that information to the offender. The messaging system 104 can redirect the message to the appropriate address without disclosing that information to the offender.

Next, blocks 528, 532, and 536 are performed as before. Where there are no problems in block 532, processing continues to block 648 where messages for mailing are printed, which can be done under seal if the offender specifies that the message is legally protected. The message could still be stored in the message database 308 should a search warrant be issued to review the messages tagged as legal documents. In block 652, the message is delivered electronically or physically. A particular recipient can view the messages by logging into the message system 104 and/or by specifying an e-mail address to receive any messages.

A number of variations and modifications of the disclosed embodiments can also be used. For example, the above embodiments describe delivering documents to offenders, but the messages could be similarly sent to or from correctional facility administration. Some embodiments discuss having the messages go between approved persons and approved visitors. Other embodiments could allow anyone to message offenders in much the same way that mail is allowed today. The ability for offenders to send messages to anyone may be curtailed or not in various embodiments. For example, messages that are sent by offenders for printing and mailing could be unrestricted, but e-mail messages could only be to approved persons.

The techniques described herein may be implemented by various means. For example, these techniques may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques, processes and functions described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

While the principles of the disclosure have been described above in connection with specific apparatuses and methods, it is to be clearly understood that this description is made only by way of example and not as limitation on the scope of the disclosure.

What is claimed is:

1. A system for providing an inmate housed in a correctional facility with access to recorded media, the system comprising:
   one or more network interfaces configured to facilitate network access for a correctional facility system, wherein the correctional facility system corresponds to one or more correctional facilities;
   one or more user interfaces to facilitate access to information regarding one or more recorded media items from a media repository that is network-accessible;
   one or more processors coupled to the one or more network interfaces, to one or more repositories that retain information about inmates housed in the one or more correctional facilities, and to the one or more user interfaces, the one or more processors to execute instructions to:
      enable authorized access, via the one or more user interfaces, to the information regarding one or more recorded media items from the media repository based at least in part on processing authentication information corresponding to persons approved for access;
      process information regarding an identity of a first inmate housed in one of the one or more correctional facilities;
      process information regarding a selection of the one or more recorded media items for playback by the first inmate, where the one or more recorded media items were selected via one or more recorded media options, and where the one or more recorded media options exposed to the first inmate are a function of the information regarding the identity of the first inmate;
      download data corresponding to at least part of the one or more recorded media items consequent to a determination that one or more predetermined rules are not violated based at least in part on the identity of the first inmate, and retain the data in association with the first inmate; and
      enable transfer of the data to a media player medium to facilitate playback by the first inmate.

2. The system for providing an inmate housed in a correctional facility with access to recorded media of claim 1, wherein the one or more processors are to further execute instructions to:
   apply rules regulating distribution of one or more electronic copies of the one or more recorded media items.

3. The system providing an inmate housed in a correctional facility with access to recorded media of claim 1, wherein at least one of the one or more repositories is to retain account information associated with one or more of the inmates.

4. The system providing an inmate housed in a correctional facility with access to recorded media of claim 3, wherein the account information associated with one or more of the inmates comprises account information associated with the first inmate, and the one or more processors are to further execute instructions to:
   process the account information associated with the first inmate, and process transaction information related to the download of the data corresponding to the one or more recorded media items and account information associated with the first inmate.

5. The system providing an inmate housed in a correctional facility with access to recorded media of claim 1, wherein the one or more predetermined rules comprises rules governing transaction processing for an inmate account.

6. The system providing an inmate housed in a correctional facility with access to recorded media of claim 1, wherein the retaining the data in association with the first inmate comprises storing the data for transfer on demand.

7. The system providing an inmate housed in a correctional facility with access to recorded media of claim 1, wherein the one or more user interfaces are provided in conjunction with one or more kiosks in the one or more correctional facilities.

8. The system providing an inmate housed in a correctional facility with access to recorded media of claim 1, wherein the one or more user interfaces comprise a staff interface to allow staff access to the information regarding one or more recorded media items, and wherein the one or more processors are to further execute instructions to:

generate a notification that the data has been received at the one or more correctional facilities.

9. A non-transitory machine-readable medium having machine-readable instructions thereon which, when executed by one or more computers or other processing devices, implements a method for providing an inmate housed in a correctional facility with access to recorded media, causing the one or more computers or other processing devices to:

enable authorized access, via one or more user interfaces, to information regarding one or more recorded media items from a media repository based at least in part on processing authentication information corresponding to persons approved for access;

process information regarding an identity of a first inmate housed in one of one or more correctional facilities, wherein the processing is based at least in part on information from one or more repositories about inmates housed in one or more correctional facilities;

process information regarding a selection of the one or more recorded media items for playback by the first inmate, where the one or more recorded media items were selected via one or more recorded media options, and where the one or more recorded media options exposed to the first inmate are a function of the information regarding the identity of the first inmate;

download data corresponding to at least part of the one or more recorded media items consequent to a determination that one or more predetermined rules are not violated based at least in part on the identity of the first inmate, and retaining the data in association with the first inmate; and enable transfer of the data to a media player medium to facilitate playback by the first inmate.

10. The non-transitory machine-readable medium of claim 9, wherein the one or more computers or other processing devices are to further execute instructions to:

apply rules regulating distribution of one or more electronic copies of the one or more recorded media items.

11. The non-transitory machine-readable medium of claim 9, the information retained about inmates comprises account information associated with one or more of the inmates.

12. The non-transitory machine-readable medium of claim 11, wherein the account information associated with one or more of the inmates comprises account information associated with the first inmate, and the one or more computers or other processing devices are to further execute instructions to:

process the account information associated with the first inmate, and process transaction information related to the download of the data corresponding to the one or more recorded media items and account information associated with the first inmate.

13. The non-transitory machine-readable medium of claim 9, wherein the one or more predetermined rules comprises rules governing transaction processing for an inmate account.

14. The non-transitory machine-readable medium of claim 9, wherein the retaining the data in association with the first inmate comprises storing the data for transfer on demand.

15. The non-transitory machine-readable medium of claim 9, wherein the one or more user interfaces are provided in conjunction with one or more kiosks in the one or more correctional facilities.

16. The non-transitory machine-readable medium of claim 9, wherein the one or more predetermined rules comprises rules governing transaction processing for an inmate account.

17. The non-transitory machine-readable medium of claim 9, wherein the one or more user interfaces comprise a staff interface to allow staff access to the information regarding one or more recorded media items, and wherein the one or more computers or other processing devices are to further execute instructions to:

generate a notification that the data has been received at the one or more correctional facilities.

18. A method for providing an inmate housed in a correctional facility with access to recorded media, the method comprising:

enabling authorized access, via one or more user interfaces that facilitate access to information regarding one or more recorded media items from a media repository, to the information regarding one or more recorded media items from the media repository based at least in part on processing authentication information corresponding to persons approved for access;

processing information regarding an identity of a first inmate housed in one of the one or more correctional facilities, wherein the processing is based at least in part on information from one or more repositories about inmates housed in one or more correctional facilities;

processing information regarding a selection of the one or more recorded media items for playback by the first inmate, where the one or more recorded media items were selected via one or more recorded media options, and where the one or more recorded media options exposed to the first inmate are a function of the information regarding the identity of the first inmate;

downloading data corresponding to at least part of the one or more recorded media items consequent to a determination that one or more predetermined rules are not violated based at least in part on the identity of the first inmate, and retaining the data in association with the first inmate; and enabling transfer of the data to a media player medium to facilitate playback by the first inmate.

19. The method for providing an inmate housed in a correctional facility with access to recorded media of claim 18, further comprising:

applying rules regulating distribution of one or more electronic copies of the one or more recorded media items.

20. The method for providing an inmate housed in a correctional facility with access to recorded media of claim 18, wherein the retaining the data in association with the first inmate comprises storing the data for transfer on demand.

\* \* \* \* \*